(12) United States Patent
Gonçalves

(10) Patent No.: US 10,861,328 B2
(45) Date of Patent: Dec. 8, 2020

(54) SYSTEM FOR MONITORING DYNAMIC WEIGHING AND SPEED OF VEHICLES ON LANES

(71) Applicant: VELSIS SISTEMAS E TECNOLOGIA VIARIA S/A, Curitiba (BR)

(72) Inventor: Sergio Machado Gonçalves, Curitiba (BR)

( * ) Notice: Subject to any disclaimer, the term of this patent is extended or adjusted under 35 U.S.C. 154(b) by 267 days.

(21) Appl. No.: 16/065,984

(22) PCT Filed: Apr. 18, 2018

(86) PCT No.: PCT/BR2018/050114
§ 371 (c)(1),
(2) Date: Jun. 25, 2018

(87) PCT Pub. No.: WO2019/033185
PCT Pub. Date: Feb. 21, 2019

(65) Prior Publication Data
US 2019/0206240 A1 Jul. 4, 2019

(30) Foreign Application Priority Data
Aug. 16, 2017 (BR) .............. 102017017613

(51) Int. Cl.
*G08G 1/02* (2006.01)
*G08G 1/052* (2006.01)
(Continued)

(52) U.S. Cl.
CPC .............. *G08G 1/02* (2013.01); *E01F 11/00* (2013.01); *G01D 5/26* (2013.01); *G01G 3/125* (2013.01);
(Continued)

(58) Field of Classification Search
CPC ...... G01G 19/022; G01G 19/03; G01G 3/125; G01G 19/035; G01G 23/3728; G01G 9/00;
(Continued)

(56) References Cited

U.S. PATENT DOCUMENTS 4,990,769 A 2/1991 Hazan et al.
5,260,520 A * 11/1993 Muhs ..................... G01G 19/03
177/210 R (Continued)

FOREIGN PATENT DOCUMENTS

CN 200962255 Y 10/2007
EP 0620321 A1 10/1994
(Continued)

OTHER PUBLICATIONS

Daniel Leandro González, "New multiplexing structures for fiber optic sensors," Public University of Navarra, Department of Electric and Electronic Engineering, Jan. 2016, Pamplona.
(Continued)

*Primary Examiner* — Behrang Badii
(74) *Attorney, Agent, or Firm* — Pilloff Passino & Cosenza LLP; Sean A. Passino; Rachel K. Pilloff

(57) ABSTRACT

The present invention relates to a system for monitoring dynamic e weighing of vehicles, speed of vehicles on lanes, applied to the monitoring of road traffic variables, traffic control, maintenance and infrastructure, diagnosis of traffic problems, on toll roads and in the application of fines in irregular traffic situations, through the technology of optical fiber, with punctual and quasi-distributed sensors, that allow for quick response, to be encapsulated, to ease the process of installation and/or to protect the sensing optical fiber, to employ specific materials, they can be assembled in advanced configurations of optical networks and with the (Continued)

Figure 1:
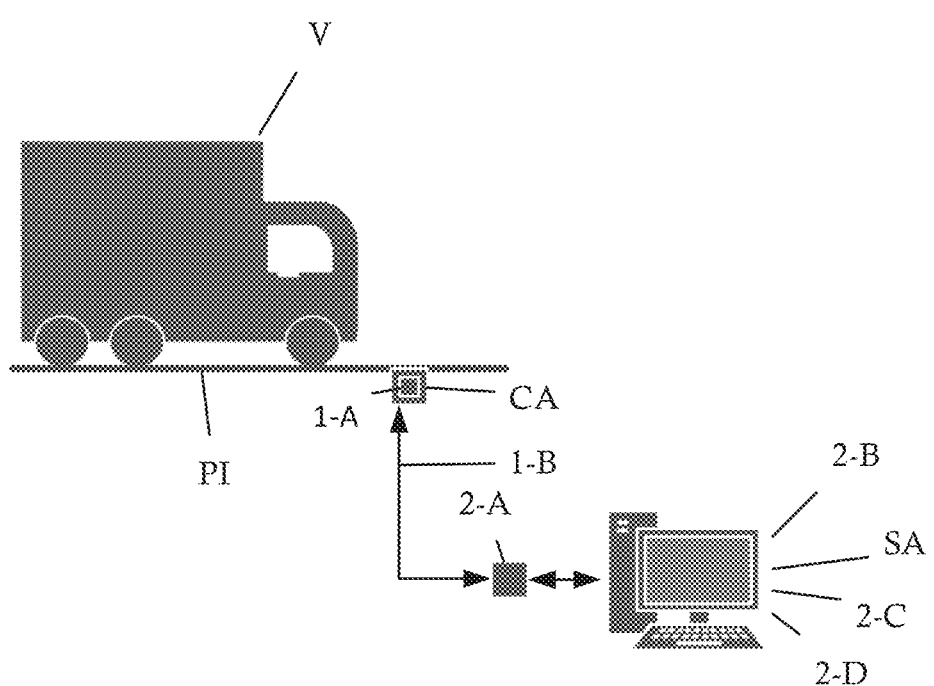

advantages of having a lower cost and prolonged shelf-life when compared to the other technologies; the sensors can be multiplexed, have high spatial resolution across the pavement, and manufacturing technology is simple and inexpensive and transferable due to associated costs.

7 Claims, 8 Drawing Sheets

(51) Int. Cl.
    *G08G 1/01* (2006.01)
    *G01G 19/03* (2006.01)
    *E01F 11/00* (2006.01)
    *G01D 5/26* (2006.01)
    *G08G 1/04* (2006.01)
    *G01G 3/12* (2006.01)
    *G01G 19/02* (2006.01)
    *G01G 23/37* (2006.01)

(52) U.S. Cl.
    CPC ......... *G01G 19/035* (2013.01); *G08G 1/0133* (2013.01); *G08G 1/04* (2013.01); *G08G 1/052* (2013.01); *G01G 19/022* (2013.01); *G01G 23/3728* (2013.01)

(58) Field of Classification Search
    CPC B28C 5/422; B28C 7/02; B28C 7/028; B28C 9/00; G08G 1/042; G08G 1/096725; G08G 1/02; G08G 1/0133; G08G 1/04; G08G 1/052; G08G 1/20; G08G 1/096716; G08G 1/096758; G08G 1/096783; G08G 1/163; G08G 1/162; G08G 1/096741; G08G 1/096791; B60T 1/10; B60T 8/00; B60T 10/00; B60T 7/042; B60T 13/585; B60D 1/26; B60D 1/62; G07C 5/0816; G07C 5/008; G07C 5/085; E01F 11/00; G01D 5/26; B60P 3/03; G01M 17/00; H04W 56/0085; H04W 4/70; B60W 30/18136; B60W 10/196; B60W 10/06; B60W 10/184; B60W 50/14; B60W 50/0098; B60W 40/09; H04L 67/12; G08B 21/06
See application file for complete search history.

(56) References Cited

U.S. PATENT DOCUMENTS

| | | |
|---|---|---|
| 5,883,585 A | 3/1999 | Akutsu et al. |
| 7,042,369 B2 | 5/2006 | Hill et al. |
| 7,926,357 B2 | 4/2011 | Dore et al. |
| 9,738,125 B1* | 8/2017 | Brickley ............... B60D 1/26 |
| 2004/0080432 A1 | 4/2004 | Hill et al. |
| 2005/0062617 A1* | 3/2005 | Dalgleish ............. G08G 1/042 |
| | | 340/988 |
| 2007/0031084 A1 | 2/2007 | Wang et al. |
| 2007/0192010 A1* | 8/2007 | Carlstrom ............. B60T 1/10 |
| | | 701/70 |
| 2009/0024336 A1* | 1/2009 | Tatom ................. G01G 19/022 |
| | | 702/56 |
| 2011/0127090 A1 | 6/2011 | Vijayaraghavan et al. |
| 2017/0023397 A1* | 1/2017 | Belloni ............... G01G 19/027 |

FOREIGN PATENT DOCUMENTS

| | | |
|---|---|---|
| EP | 2372322 A1 | 10/2011 |
| FR | 2703451 A1 | 10/1994 |
| FR | 2753530 A1 | 3/1998 |
| GB | 2056672 A | 3/1981 |
| JP | 2013104701 A | 5/2013 |
| RO | 127980 A2 | 11/2012 |
| WO | 2001027569 A1 | 4/2001 |

OTHER PUBLICATIONS

International Search Report & Written Opinion for PCT/BR2018/050114, dated Aug. 14, 2018.

* cited by examiner

SYSTEM FOR MONITORING DYNAMIC WEIGHING AND SPEED OF VEHICLES ON LANES

The present invention relates to a system for monitoring dynamic e weighing of vehicles, speed of vehicles on lanes, applied to the monitoring of road traffic variables such as, but not limited to, vehicle detection, wheel counting, identification of single and/or double wheels, measurement of individual and average vehicle speed and measurement of acceleration, and through calculation obtains axle counting, vehicle classification, vehicle counting, wheel weight measurement, axle weight measurement, measurement of the weight of groups of axles, measurement of total weight of the vehicles, that is, monitoring traffic parameters employed in the areas of road safety, traffic control, maintenance and infrastructure, diagnosis of traffic problems, on toll roads and in the application of fines in irregular traffic situations, amongst other situations. The generated information is used by various agents of society, such as government agencies responsible for the road sector, regulatory agencies, public safety entities, highway concessionaires and, in some cases, highway users themselves, bringing benefits to society and advantages of having a lower cost and extended service life of this type of sensor compared to the others, sensors can be multiplexed, have high spatial resolution across the pavement, and manufacturing technology is simple and inexpensive and transferable due to associated costs.

As it known by the inventor, in general the presence of a vehicle on the pavement can be monitored using different physical phenomena that generate information about vehicle characteristics. These characteristics are related to the constructive aspects of the vehicle, such as weight, dimensions, number of axles and wheels, amongst others, and the use of the vehicle moving on the pavement, including speed, acceleration, the number of passengers, amongst others.

Below are listed some methodologies for detection and measurement of physical parameters for, among other purposes, the measurement of speed that involve vehicular traffic:

i. Magnetic Detection: This is based on the fact that the current vehicles are built with metallic materials, the measurement is made through the magnetic field disturbance generated by means of inductive loop, or through the magnetic signature of the vehicles that is detected by inductive sensors. With the evolution of composite materials and their use in the automotive industry, it is possible that this methodology of detection is no longer feasible in the future.

ii. Image Detection: employs the capture and processing of images for the detection of vehicles and also for the detection of vehicle parameters such as license plate data.

iii. Detection by optical sensors: the use of optical sensors, the most used technologies being in these cases "LADAR" (Laser Detection and Ranging) or "LIDAR" (Light Detection and Ranging) that usually use the upper infrared bad.

iv. Detection by RADAR (Radio Detection And Ranging): employing continuous waves in the microwave range, transmits and receives, operating on the principle Doppler, which is the phenomenon of the change of the frequency of the wave after reflection as a function of the speed between the emitter and the monitored object.

v. Detection by Vibration: vibration sensors, usually piezoelectric, are used to detect the mechanical vibrations generated by the vehicle's operation and displacement transmitted to the pavement. The velocity and weight of the vehicles can be correlated with the amplitude and frequency spectrum of the vibration and the mechanical pressure on them.

vi. Detection by Deformation: The presence of the vehicle, static or moving, on the pavement causes deformations in the pavement that can be detected and measured with deformation sensors and load cells. The signs of deformation are directly proportional to the weight of the vehicles, being possible the determination of number of axles and wheels.

vii. Detection by Temperature: Temperature sensors are installed on the pavement to detect the temperature variation produced on the pavement by the tires of vehicles that heat as a function of the friction.

In some cases, a road traffic monitoring system employs a combination of two or more of the methodologies described above to generate as much information as possible, or even to reduce the uncertainties inherent in a particular technology by combining the captured data.

In order to guarantee the measurement with low uncertainty of a certain variable of interest, the most common technique adopted, regardless of the applied technology, is to have the largest possible number of readings of the data, so that it is possible a greater sampling and consequently a greater accuracy.

The main existing technology for weight measurement corresponds to piezoelectric sensors. These sensors have the following disadvantages over optical fiber-based sensors:

1. They cannot be multiplexed in the same measuring channel;
2. They have low spatial resolution across the pavement;
3. On average, they are more expensive when compared to the sensor measurement capability; and
4. Manufacturing technology is complex, costly and difficult to transfer in terms of associated costs.

As previously explained, the solutions currently used need to combine different types of sensors with various technologies to obtain precision in the weighing process. Solutions with these characteristics have a high cost of manufacturing, installation, calibration, maintenance and operation, since they require diverse techniques and are very susceptible to the need of adjustments and calibration, since the components have different physical behaviors among each other, generating great possibility of misalignment leading to measurement errors.

In case of weighing in motion, two assumptions are commonly made: the combination of different sensors (usually inductive loops in combination with piezoelectric or load cells) and the installation of a larger number of sensors when a high accuracy is needed.

In general, the dynamic measurement of vehicle weight on the pavement, which employs technology with optical fiber sensors, occurs through the measurement of deformation or vibration. These are induced to the pavement and/or to the sensor with the presence or passage of the vehicle. The main differences between the different measurement methodologies such as those reported in the literature in the form of patents or technical articles as well as those claimed in this document are the sensor element and its encapsulation. The first one can be based on the measurement of intensity, frequency and/or phase of the optical wave. The encapsulation consists of a protection element and, above all, a mechanical transducer element responsible for transforming and/or amplifying force components relating to the weight of the vehicle.

In the patent databanks, some patent registrations are found in the area of traffic monitoring with optical fiber sensors.

In the Australian patent WO2001027569A1 the optical fiber is attached to the substrate, deflection plate, which deforms with the passage of vehicles and the detection of optical fiber deformation is based on interferometric measurement.

In British patent GB2056672A the optical fiber is placed to the side and transversely to the path through which the vehicle passes.

In the American patent U.S. Ser. No. 12/376,875 it is employed a strain gauge device composed of a Fabry-Pérot interferometer with optical fiber.

In the European patent EP20110160916 a flexible plate with diffractive nets of optical fiber is used for the measurement of weight.

In the American U.S. Ser. No. 07/410,764 the optical fiber is installed between rigid and semi-rigid plates for pressure measurement through the deformation/curvature of the plates.

In the American patent U.S. Ser. No. 11/425,392 diffractive networks are connected to the mechanical structure.

In the American patent U.S. Ser. No. 10/467,075 a sensor is installed on the highway with interferometric detection by Rayleigh backscattering.

The American patent application U.S. Pat. No. 5,260,520 an apparatus for weighing a vehicle in motion is provided by employing a plurality of elongated fiber-optic sensors defined by an optical fiber embedded in an encasement of elastomeric material and disposed parallel to each other on the roadway in the path of moving vehicles. Each fiber-optic sensor is provided with a grid that can be selectively altered to provide the fiber-optic sensors with different vehicle weight sensitivities from each other for weighing vehicles in an extended weight range. Switch means are used in conjunction with the fiber-optic sensors to provide signals indicative of the speed of the moving vehicle, the number of axles on the vehicle, weight distribution, tire position, and the wheelbase of the vehicle. The use of a generally N-shaped configuration of switch means also provides a determination of the number of tires on each axle and the tire footprint. When switch means in this configuration are formed of optical fibers, the extent of light transmission through the fibers during contact with the tires of the vehicle is indicative of the vehicle weight.

Chinese utility model patent CN200962255 discloses a new fiber vehicle detector which includes light source, optical fiber sensor unit, detector, data acquisition and processing unit, wherein the optical fiber sensor unit comprises two improved Mach-Zehnder interferometric sensors which add stainless steel bar and lighter plastic sheet in the standard construction and the lighter plastic sheet can detect the signal of road shaking by the Stainless Steel bar connecting with the reinforcing steel bar under the road surface. The beneficial effects are improving the sensitivity and the anti-electromagnetic interference of the detector, having no effect of the natural environment and improving the signal-to-noise ratio by adding the stainless steel bar and the lighter plastic sheet in the interferometric sensors and always one sensing arm is reference arm and another is signal arm, besides the reference arm is immoveable corresponding to the protective case as the common-mode rejection of the differential amplifier in the electronic circuit when the stainless steel bar and the lighter plastic sheet shake together.

The Romanian patent RO127980 relates to a method for determining the weight of moving motor vehicles without restricting in any way the traffic of the motor vehicles to be weighed and to a device applying the method. The claimed method measures the variation of the optical power transmitted through an optical fiber depending on the applied variable weight, by using an optoelectronic device with a single mode or multimode optical fiber wherethrough there is propagated the luminous radiation with the wavelength in the near the spectral range emitted in continuous wave regime by a laser diode or to the LED, the optical fiber being mounted in a mechanical device which guarantees its bending depending on the weight to be measured. The claimed device comprises a near infrared radiation source which may be laser diode or LED, said laser diode or LED injecting the infrared radiation through an optical fiber bending under the weight of the weighed motor vehicle within the fiber bending assembly consisting of two fixed cylindrical supports and a mobile cylindrical support, modifying the power of the radiation transmitted through the optical fiber, the said modification being recorded by a photodiode which generates a voltage measured by means of an acquisition board connected to a computer.

The method of the invention is based on the invention of a photovoltaic system, which comprises a photovoltaic system and a photovoltaic system.

The technologies disclosed by the currently existing patents, in relation to the technology of the present patent, have the limitations, drawbacks and disadvantages of:

In patents WO2001027569A1, EP20110160916, U.S. Ser. No. 07/410,764 and U.S. Ser. No. 11/425,392 the measurement methodologies employ mechanical transducers based on deflection plates in order to transform the weight force into mechanical deformation of the optical fiber. In general, this type of sensor has large dimensions, is highly intrusive to the pavement, has geometry requirements that are highly demanding when it comes to installation and are complex to be manufactured.

The patents GB2056672A and RO127980 employ the measurement of the variation of the light intensity of the light that travels through the optical fiber as a measurement method. The variation of the intensity occurs through the strangulation of the optical fiber by means of mechanism with the passage of vehicle on the fiber. This technique is susceptible to fluctuations of the optical source and of the detection components, and are, in addition to cables and connections, inaccurate and not usable in metrological systems.

The patent U.S. Ser. No. 10/467,075 reports the use of a distributed acoustic measurement system for the monitoring of road parameters. This technique is based on measurements of the acoustic emissions from vehicles and the interaction of vehicles with the pavement.

The U.S. Pat. No. 5,260,520 reports the encapsulation of the optical fiber by elastomeric material, which is the transduction element. One of the great problems of this type of material is the temperature dependence that changes the rates of deformation. At higher temperatures, such as those encountered in lanes, the material may saturate before the end of the measurement range, thereby restricting the sensor operating range.

The Patent CN 20096255 uses mechanical transducer based on stainless steel plate and polymer bar to detect vibration. This project presents high mechanical complexity, high dependence on temperature in addition to having large dimensions and, therefore, being highly intrusive to the pavement.

"SYSTEM FOR MONITORING DYNAMIC WEIGHING AND SPEED OF VEHICLES ON LANES", object of the present patent, has been developed to overcome the limitations, drawbacks and disadvantages of existing technologies for dynamic weighing and speed measurement m roads by using technology of optical fibers in single-mount configurations with punctual and quasi-distributed sensors that allow rapid response, use of diffractive, spectrometric, interferometric and optical scattering techniques in the pulsed or continuous time or frequency domain to be used for the measurement of deformation, vibration, temperature and pressure, to be encapsulated so as to enhance sensitivity to the variables of interest, to facilitate the installation process and/or protect the optical fiber sensor, to employ specific materials such as synthetic fibers, among them carbon fibers, Kevlar and glass, resins and polymer of different epoxy or vinyl based chemical compositions, for example, and rigid metal structures; that can be installed with advanced optical network configurations such as ring networks; with the advantages of having a lower cost and an extended service life compared to the others; the sensors can be multiplexed; they have high spatial resolution across the pavement; the manufacturing technology is simple and cheap and transferable due to associated costs.

The monitoring system described in this document performs deformation, vibration, pressure and temperature measurements with a reduced number of sensors installed in on the pavement. The optical fiber sensors are miniaturized and, in many cases, there are very few intrusive, having an integrated nature and the ability to do simultaneous measurements and are quickly and easily installed and incorporated on the pavement. The sensors can be applied to the pavement without the need to be inserted into pavement, being sufficient to be placed inside structures that guarantee their physical protection against shock and friction with the rolling material (only to avoid their displacement) and to be fixed or adhered to the surface of the pavement. It presents the possibility of installing the sensors at very long distances from the unit of measurement (in the order of kilometers if necessary) without the slightest degradation of the measured parameters. Optical fiber sensors are immune to electromagnetic interference and are not susceptible to corrosion in the presence of water. The degradation temperature is higher than 100° C., reaching more than 1000° C., and tensile strength is higher than steel.

The system is applied to the monitoring of road traffic variables such as, but not limited to, vehicle detection, wheel counting, identification of single and/or double wheels, measurement of individual and average speed of vehicles and measurement of acceleration, and with calculations obtains axle counting, vehicle classification, vehicle counting, wheel weight measurement, axle weight measurement, axle group weight measurement and total vehicle weight measurement. The monitoring of traffic parameters is employed in the areas of road safety, traffic control, maintenance and infrastructure, diagnosis of traffic problems, charging on toll roads and the application of fines in irregular traffic situations, among many others situations. The generated information is used by various agents of society, such as government agencies responsible for the road sector, regulatory agencies, public security entities, highway concessionaires and, in some cases, highway users themselves.

Current technologies present the following technical problems which the invention of the present invention has solved:

A. Current weighing and speed monitoring systems use several techniques at the same time (deformation, magnetic, piezo, image, vibration temperature, radar) that, when grouped together, create difficulties of adjustment and calibration and functional misalignment, solved by the present patent through a single base that uses optical fiber that monitors multiple parameters in an integrated way and obtains precise results, adjustments and calibrations and functional alignment;

B. Current weighing and speed monitoring systems using magnetic detection exhibit operational limitation due to electromagnetic interference, solved by the present patent through a single base utilizing optical fiber that does not undergo electromagnetic interference;

C. Current weighing and speed monitoring systems using deflection plate or flexible plate or rigid or semi-rigid plate require large civil works that generate fragilization in the pavement and consequently generating periodic maintenance of the same, solved by the present patent through the use of optical fiber that leads to the miniaturization of components and consequently minimal intervention on the pavement that does not suffer fragilization;

D. Current weighing and speed monitoring systems using deflection plate or flexible plate or rigid or semi-rigid plate exhibit inaccuracies in high speed measurements, solved by the present patent through optical fiber that monitors multiple parameters in an integrated way and obtain accurate results at any speed;

E. Current weighing and velocity monitoring systems, piezoelectric or using deflection plate or flange plate or rigid or semi-rigid plate do not allow the counting of wheels, identification of single and/or double wheels, solved by the present patent through optical fiber that monitors multiple parameters in an integrated way;

F. Low spatial resolution along the highway: current sensors for dynamic weight measurement have major limitations as regards the ability to spatially discretize weight measurement along the highway either longitudinally or transversely to traffic, typically the best sensors can discern weight over a length of 1 m. This problem has been solved by the present patent through proposed sensors that can have resolution of the order of millimeters. This characteristic generates gains in the characterization of the vehicles since it allows to measure the weight in each wheel, to identify characteristics like the profile of the wheel, tires filled or empty, among others. Additionally, the uncertainty of vehicle weight measurements decreases;

G. Sensors size and impact on the pavement structure: current sensors have larger dimensions than those proposed and therefore cause greater degradation to the pavement. The conservation of pavements is one of the most important parameters in the concession of roads and large cuts for the installation of sensors and cables reduce the useful life of the pavements. Solved in the present patent by the proposed sensors which may be as narrow as a few millimeters and may require cuts of a few millimeters deep to be installed;

H. Complexity of the reading system: Current technologies are based on electrical sensors that generate low power electrical signals and therefore require complicated reading systems with many electronic and digital stages of amplification and signal conditioning, in addition they are limited in terms of the length of the connection cables of the sensors. Thus, reading equipment has large dimensions and needs protection against electromagnetic interference and uses complex signal processing and high computational demand, which raises the physical dimensions and weight of reading equipment. Solved by the present invention by sensors fed by highly efficient readout systems since they operate in the optical domain, which are highly multiplexable and are infinitely less susceptible to external interference. In addition, optical signals do not suffer from varying intensity problems because they are frequency or phase coded, so electronic hardware is relatively simple and robust and can be applied to various types of physical measurements;

I. Large number of cables: current sensors do not have significant multiplexing potential and therefore each sensor requires a cable and a reading channel in the reading system. Solved by the present patent by the proposed sensors being highly-multiplexable and that in the same optical fiber tens of thousands of sensors can be interconnected and read by single reading system;

J. Large dimensions of installations: the number of equipment, cables, sensor size and impact on the pavement structure are some of the problems of existing systems. As a consequence of these problems are the complexity of the reading system, the low capacity of multiplexing, the dimensions of the sensors and the dimensions of the installation that are considerably larger, impacting on the visual pollution and the need of space, among others. Solved by the present patent by the elegance of the proposed system that mitigates all these problems;

K. Limit distance for installation of sensors in relation to reading equipment: current electricity-based sensors cannot be at very high distances from reading equipment due to attenuation of sensor signals, susceptibility to electromagnetic interference, among others. Solved by the present invention, by sensors having the feature that they can be installed tens of kilometers from the reading unit without any limitation to the reading quality of the weight and velocity information, or any other measured physical variable;

L. Maintenance complexity: Due to the amount and complexity of electronic hardware, cables and protections of today's systems, maintenance operations become complex, time-consuming and costly. Solved by the present patent by using a system with less quantity and simplicity of hardware, reducing, simplifying and sparing money in maintenance operations;

M. Susceptibility of the cables used in the current technologies that undergo corrosion in the presence of water, solved by the present patent to use optical fiber that does not corrode, since its degradation temperature is superior to 100° C. being able to reach more than 1000° C., and the tensile strength is superior to steel; and N. Intrusive installation at the pavement: the current sensors, as well as those reported in the patent review mentioned above, are intrusive and need to be inside the pavement, either partially or in full; the proposed sensors may be very intrusive or non-intrusive and installed on the pavement surface.

The vehicle monitoring system object of the present patent was obtained after research and development of processes and devices that aimed to solve the technical problems identified in the currently available technologies.

In general, optical fiber sensors are very sensitive to any change in the dimensions or to the refractive index of the sensing optical fibers. Thus, simply moving the optical fiber from rest can cause large measured signal changes. In the same way with respect to small thermal variations. Based on this understanding and the ability to perform the interrogation system, the measurement of moving weight (as well as the measurement of all other traffic signals as mentioned above) requires attention to the possible over-sensitivity of the optical fiber. Another important point is that the glass is very resistant to mechanical traction and compression and also very thermally stable, but it has a great sensitivity to the shear stresses, which should always be avoided or mitigated. Thus, the methodologies for installing the sensors on the pavement in accordance with the system object of the present patent took into account the above premises without losing the ability to measure the variables of interest.

The sensor reading and interrogation system consists of an optoelectronic system that transforms optical signals into electrical signals containing amplitude, frequency, and phase information. This signal is transmitted to an electronic processor that processes it for determination of deformation, vibration and temperature parameters that, resolved in time, can be converted into information of weight, speed, number of axes among other parameters of the vehicles.

The optoelectronic system employs optical broadband sources such as LEDs and SLEDs, or narrowband sources such as continuous or pulsed, static or scanning lasers, with high and low temporal and spatial coherences, and lamps of various types, as well as, single photodetectors such as pin and avalanche photodiodes, among others, or CCDs and detector arrays. In addition, it can have different configurations depending on the parameter of interest to be measured, its location and the uncertainty in the measurement value.

In general, the sensors installed on the pavement detect deformation, vibration and temperature in a continuous way allowing the detection and measurement of traffic parameters related to traffic of vehicles on the sensors. The signals from the sensors are driven to the optoelectronic reading and interrogation system which converts them to electronic signals that are sequentially processed and traffic information is generated.

The sensors are installed inside or on the pavement, the latter being considered as non-intrusive method, as it does not require the infrastructure of the road (asphalt or pavement) to be modified for the installation of the sensors, and may, simultaneously or not, measure variation of temperature, pressure, vibration and deformation induced to the pavement with the passage of vehicles. The processing of these variables allows to generate simultaneously and in real time numerous parameters of traffic, such as: counting, classification, speed, weight, vibration, wear, but not limited to them.

The system for monitoring, detecting, sorting, measuring (including calculating speed, size, weight, number and distance of the axles, single or double wheeled type etc.) of moving (low and high speed) or stopped vehicles, object of the present patent, is based on optical fiber sensors. Optical fiber sensors consist of a technology that exploits the full potential of optical fibers for the measurement of physical and chemical variables. Optical fibers consist of excellent means of signal transmission, have very small dimensions and are most often made of glass, so they can be used for the development of remote sensing systems, miniaturized and immune to all types of electromagnetic interference.

The novelty of the present invention lies in the transducers and in the configuration of the installation.

Three transducer element settings are displayed. These configurations are described as model I, model II and model III.

Model I consists of a braid-shaped sensor comprised of optical fiber and synthetic fibers of high mechanical and thermal performance material such as carbon, kevlar or glass. The purpose of synthetic fibers is to protect the optical fiber from shear stresses and to promote anchorage of optical fibers to the pavement. Any type of braid between the optical fiber and the synthetic fibers is possible, as well as the simultaneous use of more than one type of synthetic fiber or more than one optical fiber of the same type or not. The sensor can be directly incorporated into the pavement, integrating perfectly with the bitumen, or can be installed on the surface of the pavement in shallow channel, less than 10 mm deep, with addition of bitumen. In addition to the ease of installation, this sensor is minimally intrusive and very sensitive, easily detecting light vehicles such as motorcycles and bicycles and also heavy vehicles such as cargo trucks.

Model II consists of a thin rod sensor with a thickness in the order of 3 mm, more specifically less than 5 mm, a width in the order of 10 mm, more specifically less than 20 mm and with a length which may vary according to the need of the installation, from a few centimeters to meter units. The bar is made of composite material that contains the optical fiber inside. Resins based on epoxy, vinyl and others can be used in the manufacture of bars as well as high performance synthetic fibers such as carbon, kevlar and glass. Similar to the model I sensor, the bar-shaped sensor can also be installed in shallow channel, being minimally intrusive. Another possibility, unique to this sensor model, is the ability to be installed directly on the pavement surface and is therefore characterized as non-intrusive.

In both model I and model II the measured optical signals may contain frequency and phase information of the optical wave contained in the optical fiber. For the case of frequency detection, diffractive elements are present within the constituent fiber of the sensor. The amount and density of diffractive elements depends on variables such as applications, measured uncertainty among others, and can range from a single element to tens to hundreds per sensor.

Model III consists of a metal housing sensor responsible for isolating and transforming the vertical components of the force (weight) into horizontal components that deform parts of the metal housing and are monitored by optical fibers. The deformation of these parts can be measured by the frequency or phase of the optical wave within the fiber. The most important feature of this sensor model is the very low uncertainty.

Model IV consists of a sensor composed of a miniaturized deflection plate installed inside a force transducer and allowing indirect measurement of the weight of the vehicle. The plate deflection can be measured by the frequency or phase of the optical wave within the fiber. This type of measurement may have very low uncertainty when integrated into a power transducer.

After various tests and research and development activities, the designs constituting the system object of the present invention were reached, and described in detail below.

For a better understanding of the vehicle variables monitoring system of the present invention, the following figures are attached:

FIG. 1, which shows a schematic diagram of the system of the present patent.

Figure 2:
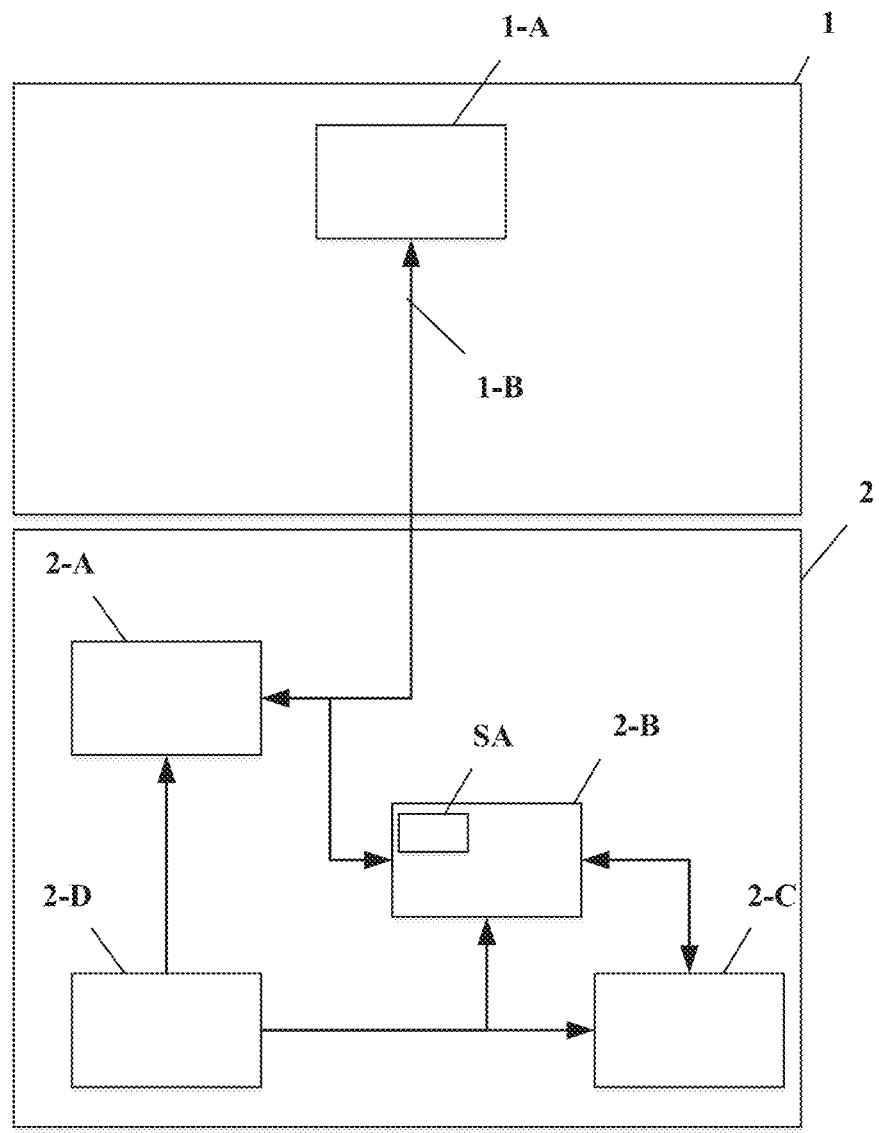
Figure 3:
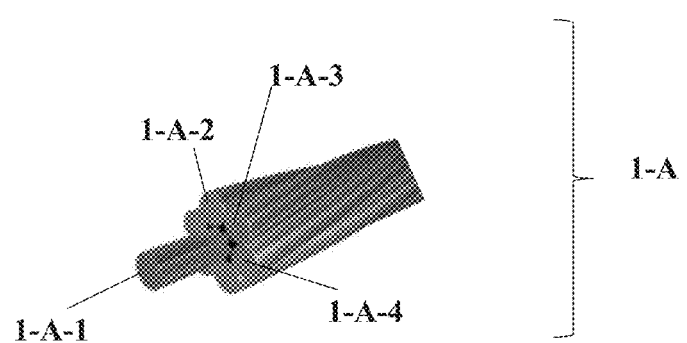
Figure 4:
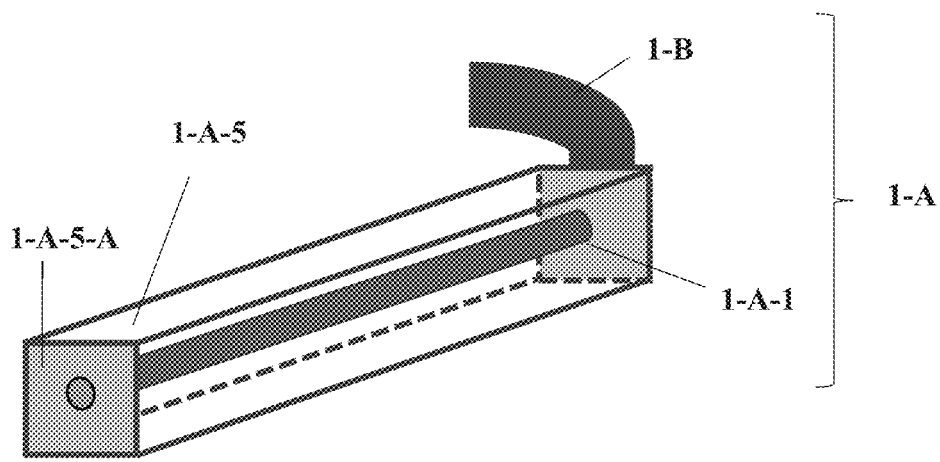
Figure 5:
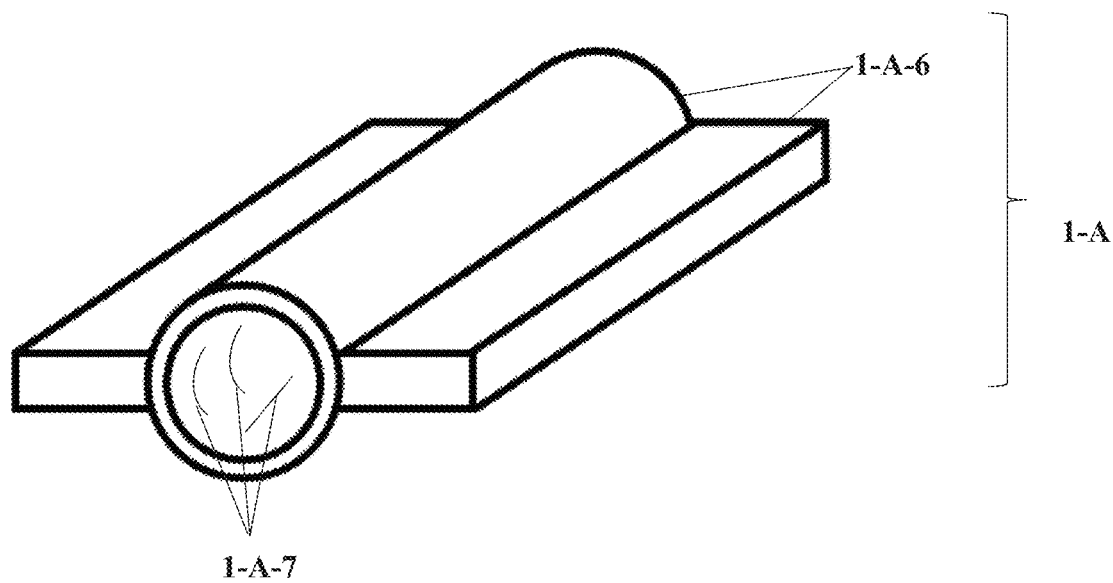
Figure 6:
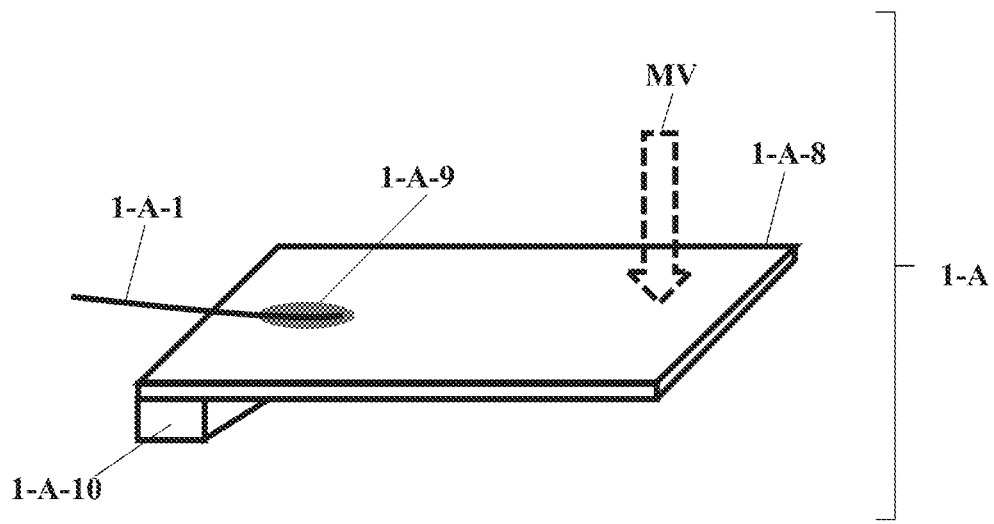
Figure 7:
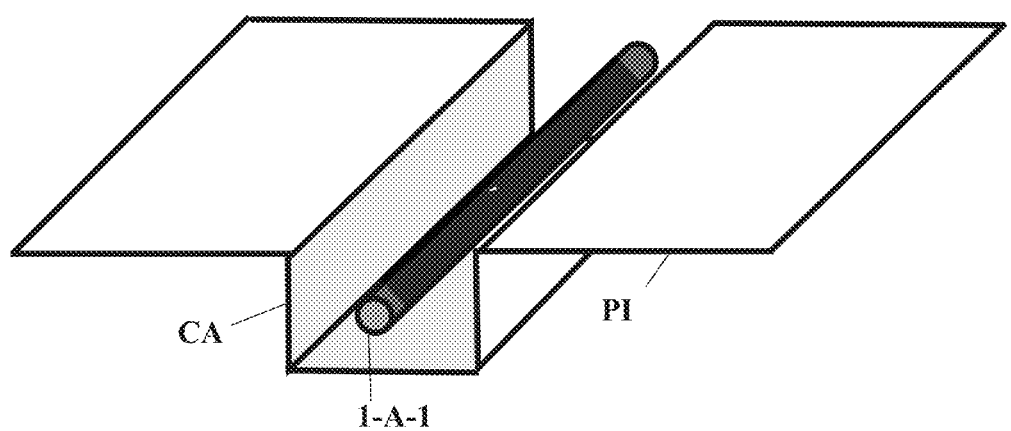
Figure 8:
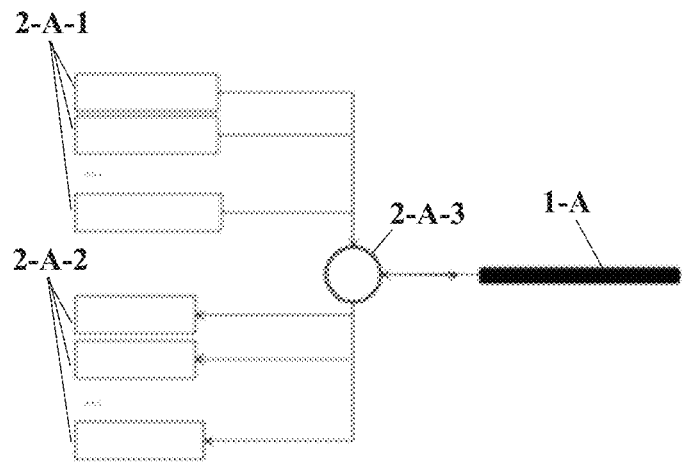
Figure 9:
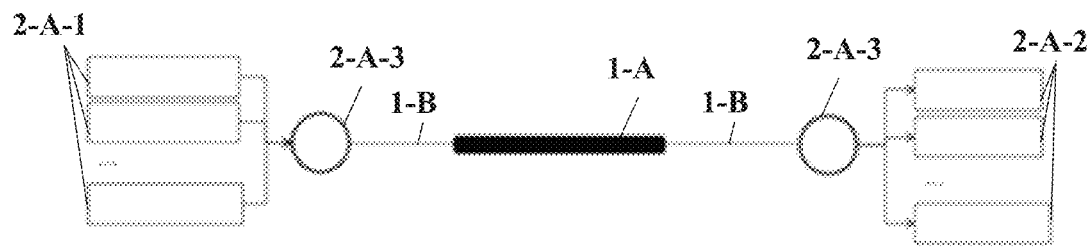
Figure 10:
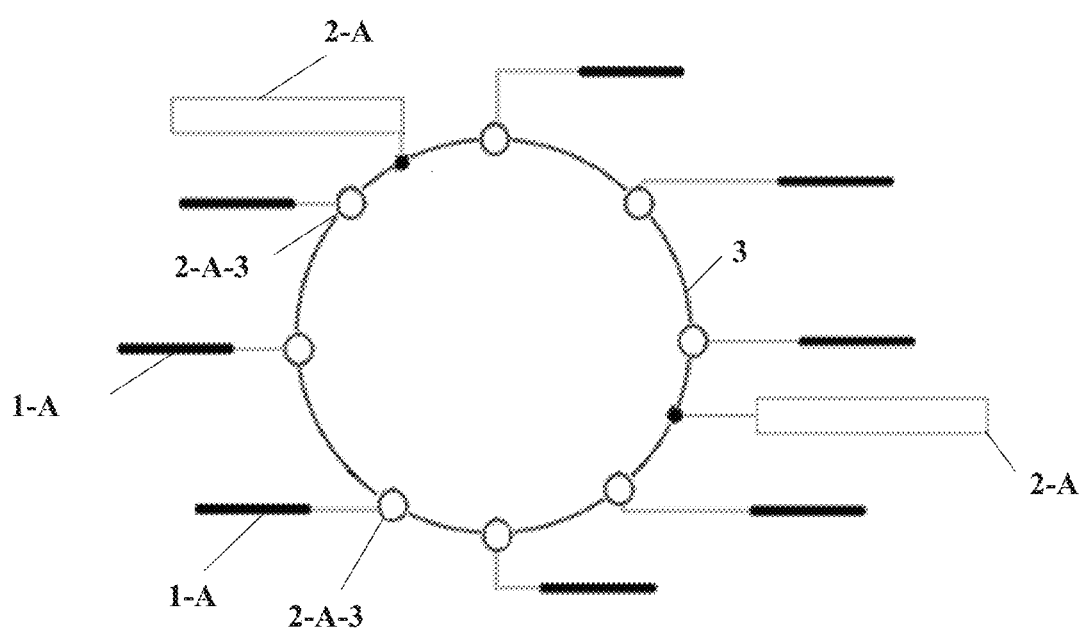
Figure 11:
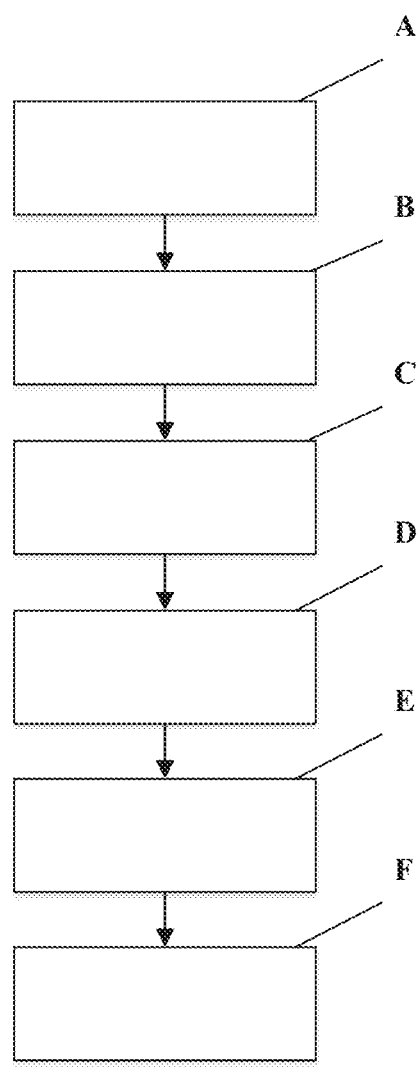

FIG. 2, showing the block diagram of the constructive modules constituting the system object of the present patent;

FIG. 3, showing the exploded perspective view of the configuration of the encapsulated model I sensor according to the present invention;

FIG. 4, showing the perspective view of the model II sensor configuration showing a transparent encapsulation for better understanding, according the present invention;

FIG. 5, showing the perspective view of the configuration of the encapsulated model III sensor according to the present invention;

FIG. 6, showing the perspective view of the configuration of the deflection-driven model IV sensor according with the present invention;

FIG. 7, showing the perspective view of a particular embodiment of the model I sensor embedded within the pavement of a vehicle traffic lane;

FIG. 8, which shows a block diagram of the system's optical fiber network with sensor detection, transmission and reading;

FIG. 9, which shows a block diagram of the optical fiber network of the sensor reading system, operating in transmission;

FIG. 10, which shows a block diagram of the optical fiber network of the sensor reading system, interconnected in the form of a ring optical network; and FIG. 11, which shows a block diagram of the dynamic weight measurement process of the present invention.

According to FIG. 1, the monitoring system of the present patent monitors the vehicle (V) on the runway (PI), using weight and speed measurement sensors (1-A), signal communication channel (1-B), optical reader (2-A) and processing unit (2-B) with recorded analysis software (SA), communication unit (2-C) and power supply (2-D).

According to FIG. 2, the monitoring system of the present patent is comprised of a sensor and signal transmission module (1) with weight and speed measurement sensors (1-A) having one optical fiber or an optical fiber network with diffractive, spectrometric, interferometric and optical scattering techniques in the time and/or frequency domain, pulsed or continuous, assembled in models I, II, III and IV configurations and bidirectionally connected to the signal communication channel (1-B) and installed on the pavement (PI), and signal communication channel (1-B) provided with an optical fiber or a network of optical fibers of single-mode or multimode type or with a complex geometry and connections assembled in reflection and transmission configurations and connected bi-directionally to the optical reader (2-A) of the reading, processing and communication module (2) and to the weight and velocity measurement sensors (1-A); and by reading, processing and communication module (2) endowed with optical reader (2-A) of laser-type or refractive or interferometric or similar type, with light sources (2-A-1) of laser, LED, superluminescent LED, ASE type or the like, with detectors (2-A-2) of the photodiodes, valves, thermopiles, pyroelectric sensors, CCDs type and the like and with coupler and/or multiplexer (2-A-3) of the circulator or multiplexer by wavelength type or with couplers with varied coupling ratios 1×99, 10×90 or 50×50, with three or more ports or the like, unidirectionally connected to the power source (2-D) and bidirectionally to the processing unit (2-B) and to the communication channel (1-B) of the sensor and signal transmission module (1), processing unit (2-B) with Intel i3 model processor or similar and that has stored an analysis software (SA), unidirectionally connected to the power supply (2-D) and bidirectionally to the communication unit (2-C) and to the optical reader (2-A), communication unit (2-C) with wireless or wired networks unidirectionally connected to the power supply (2-D) and bidirectionally processing unit (2-B) and a power source (2-D) of the linear or switched type or the like unidirectionally connected to the optical reader (2-A), to the processing unit (2-B) and to the communication unit (2-C).

Weight and velocity measurement sensors (1-A) consist of measuring elements employing optical fiber sensing technology, with diffractive, spectrometric, interferometric and optical scattering techniques in the time and/or frequency domain, pulsed or continuous and other techniques that may be developed compatible with the application in order to obtain accuracy in the measurement of deformation vibration, temperature and pressure, which allow to calculate the weight and speed of the vehicles and positioned on the pavement for the measurement of vehicle weight and/or speed. As described in FIGS. 3, 4, 5 and 6 with the configurations of the sensors that can have the models "I", "II", "III" and "IV".

The signal communication channel (1-B) consists of all cables and connections necessary to establish a reliable, efficient and secure communication channel between the sensor and signal transmission module (1) and the reading, processing and communication module (2).

The optical reader (2-A) consists of equipment responsible for reading the optical signal from the sensors and transforming it into electrical signals that can be interpreted by computer.

The processing unit (2-B) consists of a computing unit, which may be an industrial computer or a dedicated circuit or board responsible for processing, storing and sending data over the communication network.

The Analysis Software (SA) consists of a dedicated algorithm for processing the optical signals coming from the excitations received with vehicle traffic on the pavement and sensors, for converting the measured values into weight and speed. As well as dedicated algorithm for self-diagnosis, recovery of data and failure and process control. The communication unit (2-C) consists of the electronic circuit responsible for communication between the reading, processing and communication module (2) and other communication equipment or networks for the sending and receiving of traffic processing data. For example, communication by Wi-Fi wireless networks, NFC, WSN among others or wired communication with twisted paired or coaxial cables, optical fibers among others.

The Power Supply (2-D) consists of an electronic power circuit for powering all active and passive components in the reading, processing and communication module (2).

According to FIG. 3, the sensor (1A) in the model "I" configuration where the optical fiber (1-A-1) is physically surrounded by synthetic fibers (1-A-2), (1-A-3), and (1-A-4) in braided form, which may be composed of a single type of fiber or of more than one type of fiber, such as carbon, kevlar and glass fibers, the amount of synthetic fiber yarns can also be varied in quantity above three. It is also possible for the optical fiber assembly (1-A-1) and synthetic fibers (1-A-2), (1-A-3), and (1-A-4) to be surrounded by resins, asphalt bitumen or other material of interest.

According to FIG. 4, there is shown the model "II" sensor (1-A) where the optical fiber (1-A-1) is incorporated in an encapsulation (1-A-5) with cross-section (1-A-5-A) of varying dimensions that may be polygonal prismatic, oval or circular, or irregular in shape. This pan can be hollow or filled with different materials such as synthetic fibers, resins, polymers, liquids and gels, to increase the response to the measurement of interest as well as to protect the optical fiber. An optical fiber cable of the signal communication channel (1-B) is used to connect the sensor to the reading unit.

According to FIG. 5, there is shown the model "III" sensor (1-A), which consists of a metal encapsulation (1-A-6) with anchorage and a polygonal prismatic shape and a central cylindrical or rhomboid prismatic shaped shell that maximizes sensitivity and accuracy in weight and velocity measurement, which concatenates mechanical forces whose function is to increase the sensitivity in the measurement of transverse force components. One or more sensing optical fibers (1-A-7) are fixed within the housing in order to measure the distribution of mechanical tensile stresses and temperature. The dimensions of the anchor elements and of the cylinder are related to the type of pavement where the sensors are installed, the type of vehicles to be monitored, the metal used and the variable to be monitored.

According to FIG. 6, there is shown the Model IV sensor (1-A) consisting of a miniaturized deflecting plate (1-A-8), set in a holder (1-A-10), which transforms the weight-force in motion (MV), generated from the flow of vehicles on the sensor installed inside a power transducer positioned on the pavement. The sensing optical fiber (1-A-1) is fixed in the region of greatest deformation of the plate using adhesive (1-A-10). The total dimensions of this mechanical system are proportional to the dimensions of an optical fiber and can be positioned inside an encapsulation similar to the model "III" sensor.

According to FIG. 7, there is shown the installation of the model "I" sensors positioned inside a groove (CA), the dimensions of which are proportional to the dimensions of the sensor and are in the order of units of millimeters, made on the surface of the pavement (PI), which can be rigid or flexible. The models "I" and "II" sensors (1-A) are incorporated into or on the pavement (PI) and covered with resin or asphalt bitumen. The models "III" and "IV" sensor (1-A) are incorporated into the pavement (PI) and covered with resin or asphalt bitumen. This process guarantees the diffusion of resin or bitumen between the sensor fibers and in the same way inside the pores of the pavement. This guarantees the integration of the sensor to the pavement and enables the measurement of deformation, vibration or temperature accurately and with high sensitivity.

The reading of the signals from the optical sensors is performed with a system capable of interrogating the optical fiber in various ways and independently measuring deformation, vibration and temperature. By multiplexing optical signals in time, wavelength, frequency and phase, switching between optical sources and tuned detectors to read certain variables, it is possible to increase the detection capacity of the system and also to exploit the potential of the sensors installed on the pavement. Therefore, the reading system is flexible and can simultaneously read any previously described sensor mode or individually as required.

The sensors can also be interconnected in the form of an optical network exploiting the potential of optical telecommunications technology.

According to FIG. 8, there is shown a first alternative optical fiber network for reading the sensors, wherein the configuration of sensors (1-A) can be distributed and/or quasi-distributed and/or punctual, operating in reflection. One or more sources (2-A-1) and one or more signal communication channels (1-B) that are coupled through couplers (2-A-3) one or more detectors (2-A-2) providing high system multiplexing capability.

According to FIG. 9, there is shown a second optical fiber network alternative for reading the sensors, wherein the configuration of sensors (1-A) can be distributed and/or quasi-distributed and/or punctual, operating in transmission. One or more sources (2-A-1) and one or more signal communication channels (1-B) that are connected to one or more detectors (2-A-2) connected through couplers (2-A-3) providing high system multiplexing capability.

According to FIG. 10, there is shown a third optical fiber network alternative for reading the sensors, wherein the configuration of sensors (1-A) can be distributed and/or quasi-distributed and/or punctual, operating in a ring network. One or more optical readers (2-A), one or more signal communication channels (1-B) which are connected via couplers (2-A-3), to the ring network (3) obtains continuity of operation with the disruption of one or more signal communication channels (1-B).

In addition to the ring configuration, other configurations, whether traditional or not, used in optical telecommunication systems may be employed in optical fiber sensor systems for road monitoring. This type of opportunity is especially valuable in facilities with large number of monitoring points, such as toll plazas and crossings in urban centers, or highways with many roads, etc.

Numerous measurement techniques employing optical fibers, in particular here, measurements of deformation, vibration, temperature and pressure, make use of point and quasi-distributed sensors. Diffractive, spectrometric, interferometric and optical scattering techniques, in time or frequency domain, pulsed or continuous are used to measure deformation, vibration, temperature and pressure.

Optical fiber sensors can be encapsulated for the measurement of deformation, vibration and pavement temperature. The encapsulation of the optical fiber sensors can have different goals, enhance the sensitivity to the variables of interest, facilitate the installation process and/or protect the optical fiber sensor. The design and manufacture of the encapsulations employ specific materials such as synthetic fibers, among them carbon, kevlar and glass fibers, resins and polymer of different epoxy or vinyl based chemical compositions, for example, and rigid metal structures.

According to FIG. 11, the dynamic weight measurement process of a moving vehicle occurs in the following operating sequence:

A) From the illumination provided by the light source (2-A-1) to the optical channel, the light is guided to the sensors (1-A) and from them is guided to the detectors (2-A-2);

B) Vehicles position or pass over the sensors (1-A), generating vibration and deformation on the pavement (PI) and sensors that are detected independently or simultaneously;

C) Measurements are taken at high frequencies, greater than 100 Hz, deformations and vibrations induced to the pavement (PI) and to the sensor (1-A) are detected;

D) In vibration and deformation measurements, the sensors (1-A) measure frequency, amplitude or phase signals of the mechanical forces produced by the vehicles and by the traffic of the vehicles on the pavement (PI) and on the sensors (1-A);

E) Optical signals from the sensors 1A with the vibration and deformation information are read by the optical reader 2A and converted into electrical signals for further processing;

F) Electrical signals are processed by dedicated algorithms generating information about weight by axle, weight per wheel, total gross weight and speed by software (SA); and G) Weight and speed information are stored and shared with local or remote computers via the communication system (2-C) using wireless or wired networks.

The invention claimed is:

1. A system for monitoring dynamic weighing and speed of a vehicle, comprising sensor (1-A) where optical fiber (1-A-1) is incorporated in an encapsulation (1-A-5) in a bar with cross-section (1-A-5-A) of a polygonal prismatic, oval or circular form, or irregular in shape, hollow or filled, with a thickness smaller than 5 mm and length smaller than 20 mm, the system configured for:

A) guiding light, from illumination provided by a light source (2-A-1) to an optical channel, to sensors (1-A) and guiding from the sensors (1-A) to detectors (2-A-2);

B) generating vibration and deformation on a pavement (PI) when the vehicle position passes over the sensors (1-A), wherein the sensors (1-A) detect the vibration and deformation independently or simultaneously;

C) measuring, with sensors (1-A), at frequencies greater than 100 Hz, the vibration and deformation induced to the pavement (PI) by the vehicle;

D in the vibration and deformation measurements, the sensors (1-A) measure frequency, amplitude or phase signals of the mechanical forces produced by the vehicle and by the traffic of the vehicle on the pavement (PI) and on the sensors (1-A);

E) reading by the optical reader (2-A), optical signals from the sensors (1-A) with vibration and deformation information and converting the optical signals into electrical signals for further processing;

F) processing the electrical signals to generate information about weight by axle, weight per wheel, total gross weight and speed; and G) storing the weight and speed information on a non-transient computer readable medium and sharing the weight and speed information with a local or remote computer via a communication system (2-C) via a wireless or a wired network.

2. A system for monitoring dynamic weighing and speed of a vehicle according to claim 1, comprising a sensor and signal transmission module (1) with weight and speed measurement sensors (1-A) having one optical fiber or an optical fiber network with diffractive, spectrometric, interferometric and optical scattering techniques in the time and/or frequency domain, pulsed or continuous, bidirectionally connected to the signal communication channel (1-B) and installed on the floor (PI), and signal communication channel (1-B) provided with an optical fiber or a network of optical fibers of single-mode or multimode type or with a complex geometry and connections assembled in reflection and transmission configurations and connected bidirectionally to the optical reader (2-A) of the reading, processing and communication module (2) and to the weight and velocity measurement sensors (1-A); and by reading, processing and communication module (2) endowed with optical reader (2-A) of laser-type or refractive or interferometric or similar type, with light sources (2-A-1) of laser, LED, superluminescent LED, ASE type or the like, with detectors (2-A-2) of the photodiodes, valves, thermopiles, pyroelectric sensors, CCDs type and the like and with coupler and/or multiplexer (2-A-3) of the circulator or multiplexer by wavelength type or with couplers with varied coupling ratios 1×99, 10×90 or 50×50, with three or more ports or the like, unidirectionally connected to the power source (2-D) and bidirectionally to the processing unit (2-B) and to the communication channel (1-B) of the sensor and signal transmission module (1), processing unit (2-B) with Intel i3 model processor or similar and that has stored an analysis software (SA), unidirectionally connected to the power supply (2-D) and bidirectionally to the communication unit (2-C) and to the optical reader (2-A), communication unit (2-C) with wireless or wired networks unidirectionally connected to the power supply (2-D) and bidirectionally processing unit (2-B) and a power source (2-D) of the linear or switched type or the like unidirectionally connected to the optical reader (2-A), to the processing unit (2-B) and to the communication unit (2-C).

3. A system for monitoring dynamic weighing and speed of a vehicle according to claim 1, comprising a first alternative of optical fiber network for reading the sensors, the configuration of sensors (1-A) that can be distributed and/or quasi-distributed and/or punctual, operating in reflection with one or more sources (2-A-1) and one or more signal communication channels (1-B) that are coupled through couplers (2-A-3) to one or more detectors (2-A-2).

4. A system for monitoring dynamic weighing and speed of a vehicle according to claim 1, comprising a second optical fiber network alternative for reading the sensors, wherein the configuration of sensors (1-A) can be distributed and/or quasi-distributed and/or punctual, operating in transmission with one or more sources (2-A-1) and one or more signal communication channels (1-B) that are connected to one or more detectors (2-A-2) connected through couplers (2-A-3).

5. A system for monitoring dynamic weighing and speed of a vehicle according to claim 1, comprising a third optical fiber network alternative for reading the sensors, wherein the configuration of sensors (1-A) can be distributed and/or quasi-distributed and/or punctual, operating in a ring network with one or more optical readers (2-A), one or more signal communication channels (1-B) which are connected via couplers (2-A-3), to the ring network (3).

6. A system for monitoring dynamic weighing and speed of a vehicle according to claim 1, comprising sensors (1-A) miniaturized non-intrusive, or, when intrusive positioned inside a channel in the pavement, said channel being less than 10 mm deep.

7. A system for monitoring dynamic weighing and speed of a vehicle according to claim 1, wherein the encapsulation (1-A-5) is filled with a material chosen from synthetic fibers, resins, polymers, liquids, and gels.

* * * * *